United States Patent [19]

Chen et al.

[11] Patent Number: 5,200,284
[45] Date of Patent: Apr. 6, 1993

[54] MELAMINE-CURED POLYESTER-AMIDE COATED ARTICLES USEFUL AS TONER FUSING MEMBERS

[75] Inventors: Jiann H. Chen, Fairport; Tsang J. Chen; Lawrence P. DeMejo, Rochester, all of N.Y.

[73] Assignee: Eastman Kodak Company, Rochester, N.Y.

[21] Appl. No.: 890,494

[22] Filed: May 28, 1992

[51] Int. Cl.$^5$ .................. G03G 17/04; B32B 25/20
[52] U.S. Cl. ........................ 430/33; 428/447; 428/474.4; 525/428; 525/431; 528/26
[58] Field of Search ............ 525/428, 431, 446, 443; 528/26, 38; 428/447, 474.4; 430/33

[56] References Cited

U.S. PATENT DOCUMENTS

| | | | |
|---|---|---|---|
| 3,701,815 | 10/1972 | Matzner et al. | 528/26 |
| 3,749,757 | 7/1973 | Marzocchi | 528/26 |
| 4,348,510 | 9/1982 | Keck et al. | 528/26 |
| 4,640,962 | 2/1987 | Ostrozynski et al. | 525/474 |
| 4,758,491 | 7/1988 | Alexandrovich et al. | 430/110 |
| 4,758,637 | 7/1988 | Merrifield et al. | 525/474 |
| 4,766,181 | 8/1988 | Ostrozynski et al. | 428/395 |
| 4,814,418 | 3/1989 | Miyake et al. | 528/37 |
| 4,894,427 | 1/1990 | Yamamoto et al. | 528/26 |
| 5,004,793 | 4/1991 | Nagaoka | 528/15 |
| 5,119,140 | 6/1992 | Berkes | 355/273 |

FOREIGN PATENT DOCUMENTS 2169912  7/1986  United Kingdom .

*Primary Examiner*—Ralph H. Dean, Jr.
*Attorney, Agent, or Firm*—William T. French; David F. Janci; Alfred P. Lorenzo

[57] ABSTRACT

Toner fusing members coated with melamine-cured polyester-amide compositions are obtained wherein the polyester-amide component is a copolymer of one or more organic dicarboxylic acids with 2,2-bis(4-hydroxyphenyl)hexafluoropropane and an aminoalkyl-terminated organopolysiloxane.

10 Claims, No Drawings

MELAMINE-CURED POLYESTER-AMIDE COATED ARTICLES USEFUL AS TONER FUSING MEMBERS

FIELD OF INVENTION

This invention relates to toner fusing members coated with a melamine-cured polyester-amide composition wherein the polyester-amide is derived from a fluorine-containing diol and an aminoalkyl-terminated organopolysiloxane.

BACKGROUND OF THE INVENTION

In certain electrostatographic imaging and recording processes, for instance, in electrophotographic copying processes, an electrostatic latent image formed on a photoconductive surface is developed with a thermoplastic toner powder which is thereafter fused to a substrate. The fusing member can be a roll, belt or any surface having a suitable shape for fixing thermoplastic toner powder images to a substrate. The fusing step commonly consists of passing the substrate, such as a sheet of paper on which toner powder is distributed in an imagewise pattern, through the nip of a pair of rolls. At least one of the rolls is heated and in the case where the fusing member is a heated roll, a smooth resilient surface is bonded either directly or indirectly to the core of the roll. Where the fusing member is in the form of a belt it is preferably a flexible endless belt having a smooth, hardened outer surface which passes around the heated roller. A persistent problem in this operation is that when the toner is heated during passage through the rolls it may tend to adhere not only to the paper but also to the fusing member which contacts it. Any toner remaining adhered to the member can cause a false offset image to appear on the next sheet that passes through the rolls and can also degrade the fusing performance of the member. Another problem may occur as a result of continued heating causing degradation of the member surface which results in an uneven surface and defective patterns in thermally fixed images.

Toner fusing rolls are composed of a cylindrical core which may contain a heat source in its interior, and a resilient covering layer formed directly or indirectly on the surface of the core. A thin layer of a suitable primer is advantageously coated on the surface of the core in order to improve bonding of the layer. Roll coverings are commonly made of fluorocarbon polymers or silicone polymers, such as poly(dimethylsiloxane) polymers, of low surface energy which minimizes adherence of toner to the roll. Frequently release oils composed of, for example, poly(dimethylsiloxanes) are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having superior resistance to heat and a smooth surface. The belt substrate can be metallic or polymeric. The surface of the belt is composed of a thinly coated, low surface energy polymer such as a fluorocarbon or a silicone resin. There is a need for coating compositions which adhere strongly to the belt and form a hard, tough surface which is resistant to wear and cracking. The surface should also be resistant to cleaning solvents and fluids.

In electrostatographic imaging processes dry developers can be used to form an image on a receiving surface such as a sheet of paper. Dry developers usually comprise a toner powder and carrier particles. Carrier particles and toner particles have different triboelectric values. As the developer mixture is agitated the particles rub together and the toner and carrier particles acquire opposite electric charges and cling together. In the subsequent development step the somewhat higher opposite charge of the electrostatic latent image draws the colored toner from the carrier and develops the image. Frequently, various addenda are used to improve the properties of the toner and carrier particles.

Toners comprise, as a major component, the binder, and as minor components a colorant and a charge control agent. The binder can be any resin which has properties suitable for dry toners. Many such resins are known but thermoplastic resins which are fixable by fusing are especially useful. When a dry toner powder image is transferred from one surface to another defects in the image can occur. It is known from U.S. Pat. No. 4,758,491 that by the addition of low surface energy liquid or solid addenda, especially polymers containing organopolysiloxane segments, many of these defects can be alleviated.

Carrier particles comprise magnetizable irregular particles which are usually coated with a film of a polymeric material which helps develop the triboelectric charge and aids the transfer of the toner. The coating material must adhere well to the carrier particle because the toner charge declines as the polymer wears off. Polymers with low surface energy properties are especially useful for coating carrier particles.

SUMMARY OF THE INVENTION

The present invention provides coated toner fusing members which have a low energy surface and are resistant to solvents and thermal degradation.

The coated article of the invention, such as a fusing belt, comprises a substrate and coated thereon a composition comprising a crosslinked polymeric product of a melamine resin and a polyester-amide wherein the polyester-amide is derived by polycondensation of one or more $C_{2-20}$ dicarboxylic acids or an activated derivative thereof, 2,2-bis(4-hydroxyphenyl)hexafluoropropane, and an aminoalkyl-terminated organopolysiloxane of the formula,

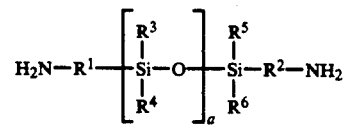

wherein,
$R^1$-$R^2$ are independently $C_{1-6}$ alkylene;
$R^3$-$R^6$ are independently $C_{1-6}$ alkyl, vinyl or phenyl; and
a is 3 to 300.

DETAILED DESCRIPTION OF THE INVENTION

The coated articles of the invention are obtained by coating a substrate with a mixture containing a polyester-amide and a melamine resin and inducing crosslinking between the active functional groups of the polyester-amide and the melamine.

The polyester-amide component of the coating composition is obtained by polycondensation of an organic $C_{2-20}$ dicarboxylic acid or an activated derivative thereof with 2,2-bis(4-hydroxyphenyl)hexafluoropropane and an aminoalkyl-terminated organopolysiloxane.

Suitable organic dicarboxylic acids are $C_{2-20}$ dicarboxylic acids including arylene dicarboxylic acids and alkylene dicarboxylic acids. Arylene dicarboxylic acids are preferably $C_{8-20}$ aromatic dicarboxylic acids. Exemplary aromatic dicarboxylic acids include terephthalic acid, isophthalic acid, phthalic acid, 1,5-naphthalene dicarboxylic acid, 4,4'-diphenyldicarboxylic acid, methylenediphenyl-4,4'-dicarboxylic acid, benzophenone-4,4'-dicarboxylic acid, and the like. Alkylene dicarboxylic acids are preferably $C_{2-10}$ alkylene dicarboxylic acids. Exemplary alkylene dicarboxylic acids include succinic acid, adipic acid, azelaic acid, sebacic acid and the like. The aforementioned acids may be used either alone or as a mixture of two or more members. Activated derivatives of the carboxylic acids include esters, for example, methyl and ethyl esters, acid halides such as acid chlorides and acid bromides, and acid anhydrides.

The polyester-amides of use in carrying out the invention comprise a polyester backbone containing aminoalkyl-terminated organopolysiloxane units of the formula,

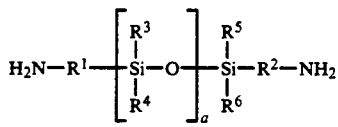

wherein, $R^1$ and $R^2$ are independently $C_{1-6}$ alkylene;

$R^3$-$R^6$ are independently $C_{1-6}$ alkyl, vinyl or phenyl; and a is 3 to 300.

In the aminoalkyl-terminated organopolysiloxane:

Alkylene groups which $R^1$ and $R^2$ represent include methylene, ethylene, propylene, butylene, pentylene and hexylene.

Alkyl groups which $R^3$-$R^6$ represent include, methyl, ethyl, propyl, isopropyl, butyl, sec. butyl, pentyl and hexyl.

Preferred polyester-amides are those containing the aminoalkyl-terminated organopolysiloxane units in which;

$R_1$ and $R^2$ are propylene or butylene;

$R^3$-$R^6$ are independently methyl or phenyl, preferably methyl;

a is 10 to 100.

The polyester components of the coating composition comprising an organic dicarboxylic acid and 2,2-bis(4-hydroxyphenyl)hexafluoropropane can be prepared under the reaction conditions conventionally adopted in the production of polyesters. These processes include, for example, catalyzed esterification of the dicarboxylic acid and catalyzed transesterification of the dicarboxylic acid diester with the appropriate diol. In general these methods require elevated temperatures.

A preferred procedure, which is particularly adaptable to the preparation of the polyester-amides for use in this invention, utilizes the diacids in the form of the diacid halides.

A polyester-amide is readily prepared, for example, by condensing an aromatic dicarboxylic acid chloride or an alkylene dicarboxylic acid chloride or a mixture thereof with 2,2-bis(4-hydroxyphenyl)hexafluoropropane in a suitable aprotic solvent, in the presence of a base and at a temperature of, for example, from 0°-50° C. Suitable aprotic solvents include, for example, a halogenated organic solvent such as methylene chloride, and tetrahydrofuran. Suitable bases include tertiary amines, for example, pyridine and triethylamine. Incorporation of the aminoalkyl-terminated organopolysiloxane units into the polyester is readily achieved under these conditions by adding the appropriate diamine, for example a 3-aminopropyl-terminated polydimethylsiloxane (Mn 14,000), to the initial reaction mixture and carrying out the reaction under the conditions described above.

Physical properties, such as glass transition temperature (Tg °C.), solvent solubility and surface energy, of the polyester-amide can be varied by adjusting the relative amounts of each component. These properties will, in turn, contribute to the properties of the cured coating compositions by affecting, for example, toner release, resistance to solvents, thermal stability, hardness and toughness.

Preferred polyester-amides polymers have a number-average molecular weight in the range of 5,000 to 500,000; preferably 20,000-200,000; the Tg's are 80° C. or higher, preferably 100° C. or higher; and the aminoalkyl-terminated organopolysiloxanes blocks should represent 20 to 80 weight percent, preferably 30-60 weight percent of the total polymer mass.

The starting diacids, and activated derivatives thereof, for the polycondensation reactions described above are either commercially available or readily prepared by standard methods known in the art.

The aminoalkyl-terminated organopolysiloxanes for reacting with the diacids are readily prepared, for example, by ring-opening polymerization of any cyclic monomers which yield the disubstituted-siloxane repeating units, with aminoalkyl functionalized disiloxanes. Suitable cyclic monomers include, for example, octamethylcyclotetrasiloxane ($D_4$) and octaphenylcyclotetrasiloxane. Suitable aminoalkysiloxanes include, for example, 1,1,3,3-tetramethyl-3,3-bis(3-aminopropyl)disiloxane and 1,1,3,3-tetramethyl-3,3-bis(4-aminobutyl)disiloxane. The reaction may be carried out in the absence of a solvent if the reactants are liquid or in the presence of an inert solvent, for example, toluene and xylene. The polymerization is initiated by a catalyst and conducted at a temperature of, for example, from 50°-200° C. Catalysts which are preferred are the so-called transient catalysts, for example, tetramethylammonium siloxanolate and n-butyl tricyclohexylphosphonium silanolate which can be removed from the product by vacuum drying.

The polyester-amide copolymers described above are soluble in polar organic solvents, for example, chlorinated solvents such as methylene chloride, and tetrahydrofuran. They are therefore suitable for solution coating processes, especially when mixed with a crosslinking agent and subjected to curing conditions on a coated article.

These polyester-amides copolymers contain reactive sites suitable for condensation with crosslinking agents.

The reactive sites are predominantly hydroxyl and amino groups located on the endcapping units.

Crosslinking agents which can be used and which are especially useful in the preparation of surface coatings are the amino resins. The term "amino resins" is normally applied to the condensation products of formaldehyde and polyfunctional amides and amidines such as urea and melamine. The polyester-amides described above comprising fluorine and silicone blocks, when cured with melamine resins provide coating compositions with properties suitable for use in fusing members.

Melamine resins, such as Cymel-303, -308, and -358, from American Cyanamid, are used as crosslinking agents, generally constituting from 2 to 80 wt. %, preferably 20 to 40 wt. % of the final coating compositions.

The commercially available melamine resins differ principally in the number of methoxymethyl and hydroxymethyl substituents on the melamine amino groups and the degree of polymerization of the resins. The methoxymethyl and hydroxymethyl groups are both capable of acid catalyzed crosslinking with suitable nucleophiles, such as the hydroxyl terminal groups of the polyurethanes of the invention. Cymel-303 melamine resin, with a degree of polymerization of about 1.7, is composed predominantly of monomeric hexamethoxymethyl melamine and crosslinks with hydroxyl groups in the presence of a strong acid catalyst. Cymel-380 melamine resin, with a degree of polymerization of about 2.6 contains both hydroxymethyl and methoxymethyl groups and a significant level of polymeric forms, reacts readily with hydroxyl groups in the presence of weak acid catalysts. Cymel-385 melamine resin, with a degree of polymerization of about 2.1, and a high proportion of hydroxymethyl groups is a very reactive curing agent under mild acidic conditions. By degree of polymerization is meant, the average number of triazine units per molecule.

In accordance with the present invention, the coated article can be a fusing member in the form of a roll, belt or any surface having a suitable configuration for fixing or fusing a thermoplastic toner image to a substrate such as a paper sheet.

When the fusing member is in the form of a belt which passes around a heated resilient or hard roller the belt comprises a substrate having a thin, hard outer coating. The backup pressure roller has an overcoat which is sufficiently compliant that, in combination with the coated belt, a compliant surface is presented to an image carrying receiver sheet.

A coated fusing belt of the invention comprises a continuous flexible substrate having a surface covering of a melamine-cured polyester-amide of the invention. The coated fusing belt is fabricated by first preparing a solution to be used to form the coating. The solution comprises a solvent, for example, tetrahydrofuran, the polyester-amide of choice, a melamine resin and a catalyst useful for crosslinking of the hydroxy- or amino-terminated polyester-amide with the melamine resin's reactive groups. The solution contains, for example, 10-30 weight percent of the polyester-amide and 2-10 weight percent of the melamine resin. The coating solution is applied to the belt substrate by well known techniques such as blade application or ring coating to give a 2-20 micron thick layer. Curing is accomplished in about 30 min. to 3 hrs., at temperatures from about 100° to 250° C., using an acid catalyst, such as p-toluenesulfonic acid or trifluoroacetic acid, at about 0.001% to 1.0% with respect to total solids in the formulations. In a preferred embodiment curing is accomplished by heating at about 130°-210° C. for one hour.

The melamine-cured, thermoset resins of the invention provide hard, tough, low surface energy coatings for such fusing members and have the advantages of excellent thermal stability, good releasing properties, resistance to cleaning solvents and swelling by release oils, and resistance to abrasion and delamination. Fusing members can be coated with a thin, hardened surface which resists wear and cracking and resists the tendency of toner to become embedded on the surface. Their superior resistance to swelling by release oils results in a reduction or elimination of step patterns in electrophotographic copies.

The polyester-amides described above and the coating compositions of the invention having the properties described above can also be advantageously used as low surface energy addenda for toners and toner carrier particles.

Cured coatings of the invention, on stainless steel shims or copper foils at dry thickness of about 0.5 micron to 50 microns, have exhibited good adhesion to the substrates with excellent resistance against common organic solvents, such as acetone and toluene. In addition, when evaluated as image-fixing media, the coatings have shown desirable release properties with low or no off-settings under simulated fusing conditions, as indicated in examples hereinafter.

The propensity of toner particles to adhere to hot, image-fixing media is evaluated by a simple "snapping test", in which toner particles are pressed firmly against the heated surface of a testing strip by means of a spatula, and the spatula is then lifted to see if any toner particles are adhered onto the testing strip. A clean separation of toner particles from the hot surface is a criterion for using such a coating as an image-fixing medium.

EXAMPLES

The following examples illustrate the preparation of fluoro/silicone modified polyester-amides, as well as coating, curing and testing of strips under simulated fusing conditions.

EXAMPLE 1

Preparation of a Copolyester-amide of Azelaic acid, Isophthalic Acid, BPAF and Aminopropyl-terminated PDMS.

Materials used on carrying out the condensation polymerization were purified as follows:
  Azelaic acid chloride by vacuum distillation before use;
  Isophthalic acid chloride by recrystallization from hexane;
  2,2-Bis(4-hydroxyphenyl)hexafluoropropane (known as BPAF) by recrystallization from aqueous acetic acid (20%); and
  3-aminopropyl-terminated polydimethylsiloxane (PDMS) from ring opening polymerization of octamethylcyclotetrasiloxane (D4) in the presence of an end-capper 1,1,3,3-tetramethyl-3,3-bis(3-aminopropyl)disiloxane, having a number-average molecular weight of about 14,000.

Thus, to a 3 liter, 3-necked round bottom flask equipped with a mechanical stirrer, an addition funnel, and a nitrogen inlet were charged 68.5 g. of BPAF, 50 g. of aminopropyl terminated PDMS as described above, and 51.5 g. of triethylamine. The content was maintained at ambient in a water bath, and stirring was commenced. Acid chlorides (19.95 g. isophthalic and 22.1 g. azelaic) were dissolved in 200 ml. of dichloromethane, and were added dropwise from the addition funnel over a period of 2 hrs. under moderate agitation. The stirring continued for an additional 60 min. Additional solution, prepared by dissolving 2.1 g. of isophthalic and 2.3 g. of azelaic acid chlorides in 200 ml. of dichloromethane, was slowly added over a 3-hr. period, to build up the viscosity, as monitored by magnitude of the torque exerted on the motor. The stirring was discontinued when no further increase in viscosity was noticed.

The polymer was diluted with 2 liters of dichloromethane and was extracted with 2 liters of water containing 25 g. of conc. sulfuric acid in a separatory funnel. The organic layer was then repeatedly washed with fresh water till neutral. The polymer was precipitated in 90% aqueous methanol in a high speed blender, and was dried under vacuum at 75° C. for 24 hrs. The resulting polymer had Tg of 117° C., and Mn of 160,000.

EXAMPLE 2

Coatings were made on glass plates and also on stainless steel shims, using polymer of Example 1. Curing conditions were at 130° C., 170° C., or 210° C. in air for 60 min., in the presence of Cymel-303 melamine resin and acid catalyst (trifluoroacetic acid), at three resin to acid ratios, based on the weight percent of each in the coating composition: (10%/1.8%), (20%/1.6%), and (30%/1.0%).

Cured strips were then subjected to snapping tests at 120° C., 150° C., 170° C., and 200° C., according to procedures described above. Each curing condition produced the results shown in Table 1.

TABLE 1

| Snapping Tests of Cured Strips at Various Temperatures | | | | |
|---|---|---|---|---|
| Weight Percent Resin for Curing | Temperature for Snapping Tests, °C. | | | |
|  | 120 | 150 | 170 | 200 |
| Glass as Substrate | | | | |
| 0 | No release | — | — | — |
| 10 | Good | Good | Good | Good |
| 20 | Good | Good | Good | Good |
| 30 | Good | Good | Good | Good |
| Stainless Steel Shims | | | | |
| 0 | Good | No release | — | — |
| 10 | Good | Good | Good | Good |
| 20 | Good | Good | Good | Good |
| 30 | Good | Good | Good | Good |

The results from the snapping tests demonstrated that in the presence of 10 to 30 wt. % Cymel-303 melamine resin, the curing temperatures, ranging from 130° C. to 210° C., had no noticeable effects on the toner release properties of coated strips; both rigid and flexible substrates responded similarly under testing conditions.

EXAMPLE 3

Fusing Release Evaluation of Coatings of Example 2 on Stainless Steel Shims

The coating strips were mounted on a test roller and run under simulated fusing conditions, to evaluate the release characteristics of the individual strips.

A branched polyester color image on laser paper released from the coatings crosslinked with 20 wt. % and 30 wt. % Cymel-303 melamine resin, but did not release from uncrosslinked coatings, or coatings crosslinked with 10 wt. % Cymel-303 melamine resin.

The following test parameters were used:
Fusing Temperature: 280° F. (approx. 138° C.)
Release Temperature: 170° F. (approx. 76° C.)
Speed: one inch per sec. (approx. 2.5 cm/sec.)
Nip Width: 100 mils. (approx. 0.005 mm)
Pressure Roll: Silicone Elastomer (Silastic J. supplied by Dow Corning Corp.)

Although the invention has been described in detail with particular reference to certain preferred embodiments thereof, it should be appreciated that variations and modifications can be effected within the spirit and scope of the invention.

What is claimed is:

1. A coated article comprising:
   a substrate, and coated thereon a composition comprising a crosslinked product of:
   a polyester-amide, and
   a melamine resin;
   wherein, said polyester-amide comprises the polycondensation product of:
   one or more $C_{2-20}$ dicarboxylic acids or an activated derivative thereof,
   2,2-bis(4-hydroxyphenyl)hexafluoropropane, and
   an aminoalkyl-terminated organopolysiloxane of the formula,

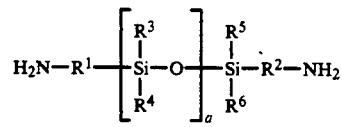

wherein,
$R^1$ and $R^2$ are independently $C_{1-16}$ alkylene;
$R^3$–$R^6$ are independently $C_{1-6}$ alkyl, vinyl or phenyl; and
a is 3 to 300.

2. A coated article according to claim 1, wherein $R^1$ and $R^2$ are $C_3$ alkylene.

3. A coated article according to claim 1, wherein $R^3$–$R^6$ are methyl.

4. A coated article according to claim 1, wherein at least one of said dicarboxylic acids is a $C_{8-20}$ aromatic dicarboxylic acid.

5. A coated article according to claim 4, wherein said aromatic dicarboxylic acid is isophthalic acid.

6. A coated article according to claim 1, wherein at least one of said dicarboxylic acids is a $C_{2-10}$ alkylene dicarboxylic acid.

7. A coated article according to claim 6, wherein said dicarboxylic acid is azelaic acid.

8. A coated article according to claim 1, wherein said substrate is a belt comprising a continuous flexible substrate.

9. A coated article according to claim 1, wherein said composition contains from 20–40 weight percent of said melamine resin.

10. A method of fusing heat-softenable toner to a substrate comprising:
    forming an image pattern of toner particles on a receiver sheet by electrostatic attraction; and
    contacting the receiver sheet with the belt of claim 8 at a temperature and pressure sufficient to fuse the toner particles to the receiver.

* * * * *